US006327785B1

(12) United States Patent
Dale, Jr. et al.

(10) Patent No.: US 6,327,785 B1
(45) Date of Patent: Dec. 11, 2001

(54) FOUR SENSOR SYSTEM FOR WHEEL ALIGNMENT

(75) Inventors: James L. Dale, Jr., Conway; Jean Oliver Wilfrid de Bellefeuille, Jr., Maumelle; Richard J. Poe, Conway, all of AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/512,461

(22) Filed: Feb. 24, 2000

Related U.S. Application Data

(63) Continuation-in-part of application No. 08/674,366, filed on Jul. 2, 1996, now Pat. No. 6,181,993, which is a continuation of application No. 07/961,945, filed on Oct. 16, 1992, now abandoned.

(51) Int. Cl.[7] ...................................................... G01B 5/24
(52) U.S. Cl. .................. 33/288; 356/139.09; 250/559.3
(58) Field of Search ........................... 33/203.18, 203.19, 33/286, 288, 203; 356/139.09, 139.03, 155; 702/150, 151, 152, 153, 159; 250/548, 559.3, 559.37

(56) References Cited

U.S. PATENT DOCUMENTS

| Re. 33,144 | 1/1990 | Hunter et al. . | |
|---|---|---|---|
| 4,097,157 | * 6/1978 | Lill | 356/139.09 |
| 4,154,531 | * 5/1979 | Roberts, Jr. et al. | 356/139.09 |
| 4,319,838 | 3/1982 | Grossman et al. . | |
| 4,341,021 | 7/1982 | Beissbarth . | |
| 4,383,370 | 5/1983 | Van Blerk et al. . | |
| 4,393,382 | * 7/1983 | Jones | 342/458 |
| 4,410,270 | 10/1983 | Zuckerman . | |
| 4,820,041 | * 4/1989 | Davidson et al. | 356/3.12 |
| 4,997,283 | * 3/1991 | Danielson et al. | 356/375 |
| 5,056,233 | 10/1991 | Hechel . | |
| 5,220,399 | * 6/1993 | Christian et al. | 356/139.09 |
| 5,268,731 | * 12/1993 | Fuchiwaki et al. | 356/139.09 |
| 5,748,505 | * 5/1998 | Greer | 702/104 |

FOREIGN PATENT DOCUMENTS 0 424 227   4/1991   (EP) .

* cited by examiner

*Primary Examiner*—Diego Gutierrez
*Assistant Examiner*—R. A. Smith
(74) *Attorney, Agent, or Firm*—McDermott, Will & Emery

(57) ABSTRACT

A four sensor wheel aligner has a single omnidirectional angle sensor mounted on each of four vehicle support wheels. Each sensor is in optical communication with the other sensors. Data is produced from which toe, camber, caster and steering axis inclination angles are computed. No reference is made to vertical. Redundant data sets are produced which provide system reliability and error tracking features and maximum accuracy from available data sets. Frame distortion measurements are made to facilitate collision repair in coordination with wheel alignment.

6 Claims, 8 Drawing Sheets

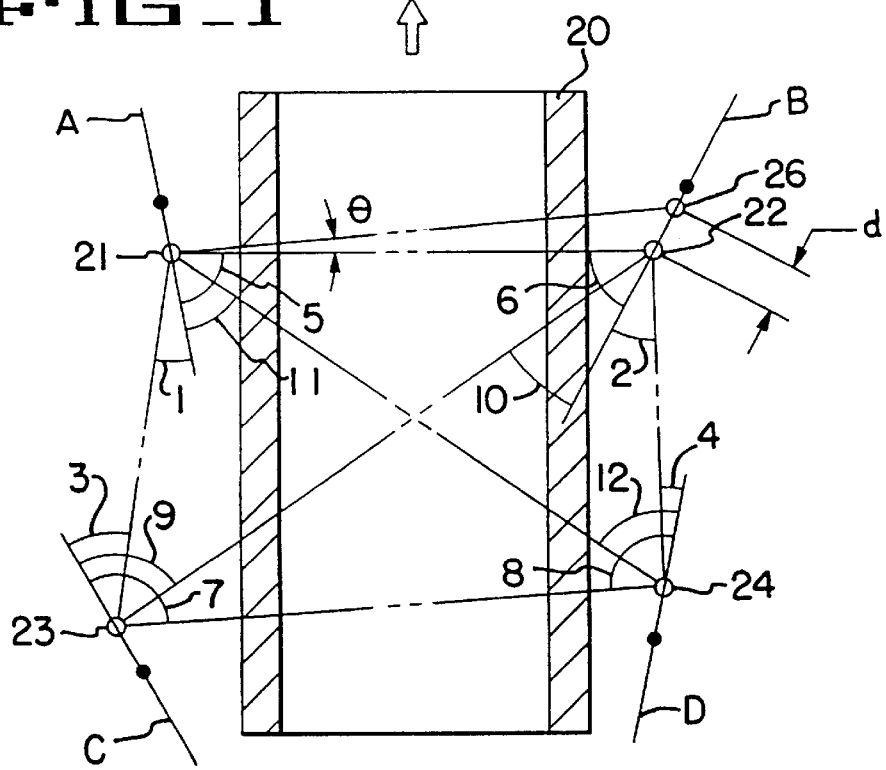
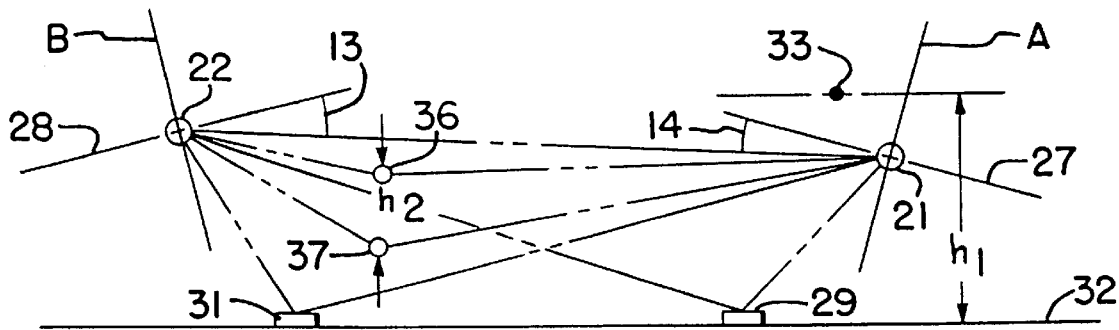

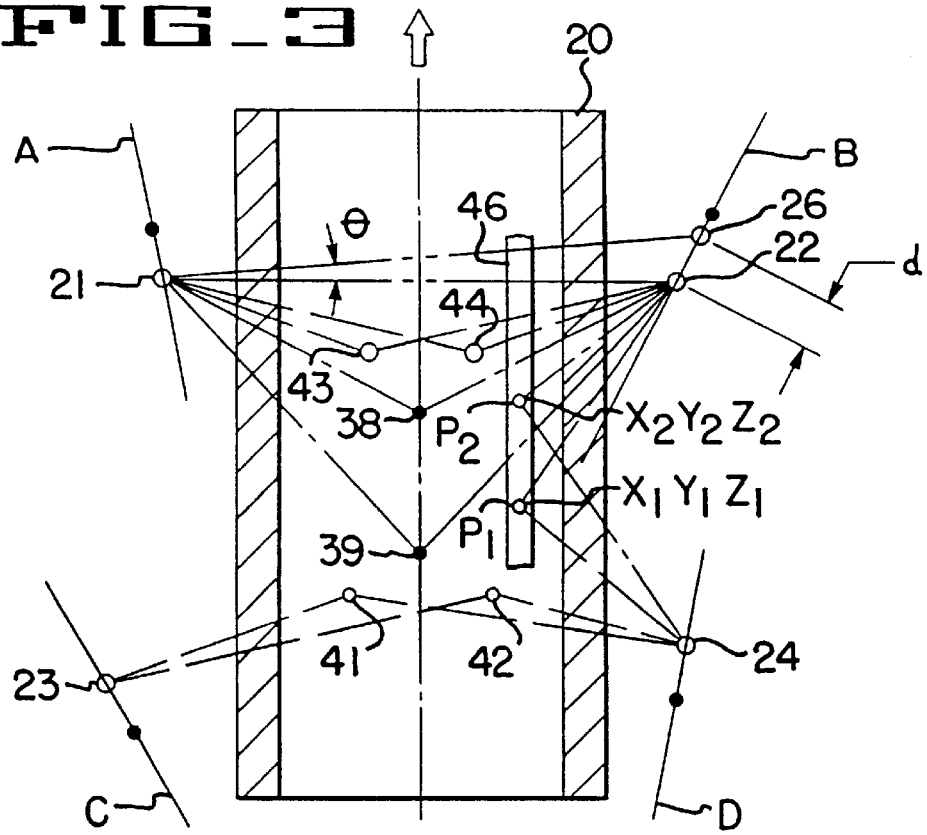
FIG_3
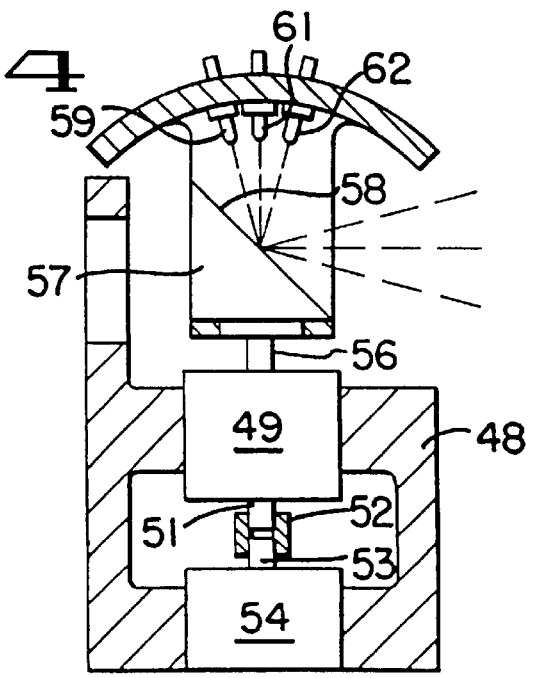
FIG_4

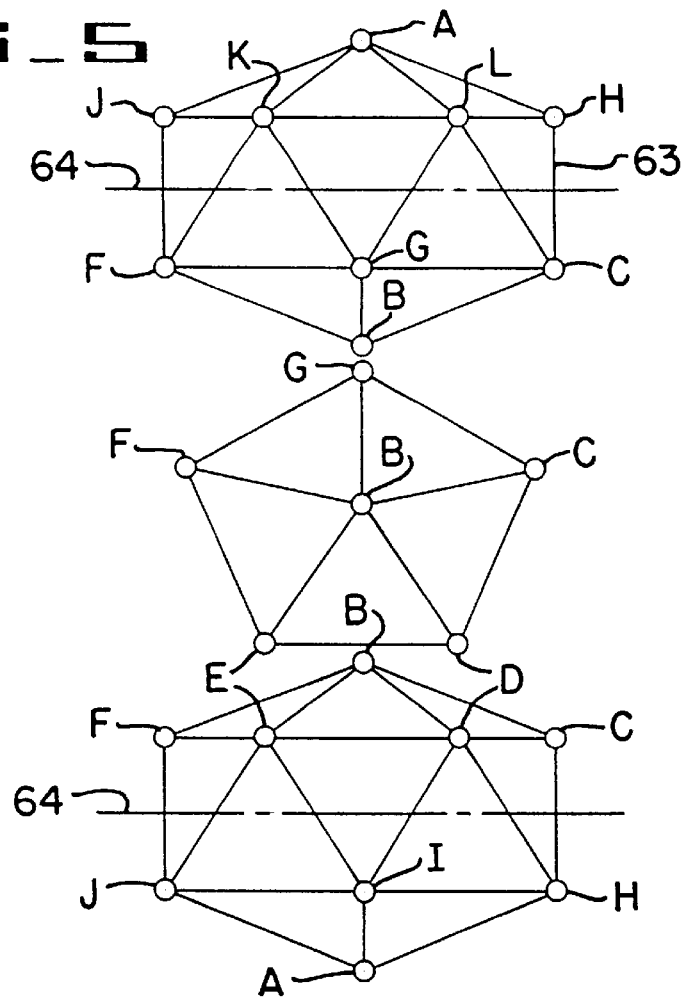
FIG_5
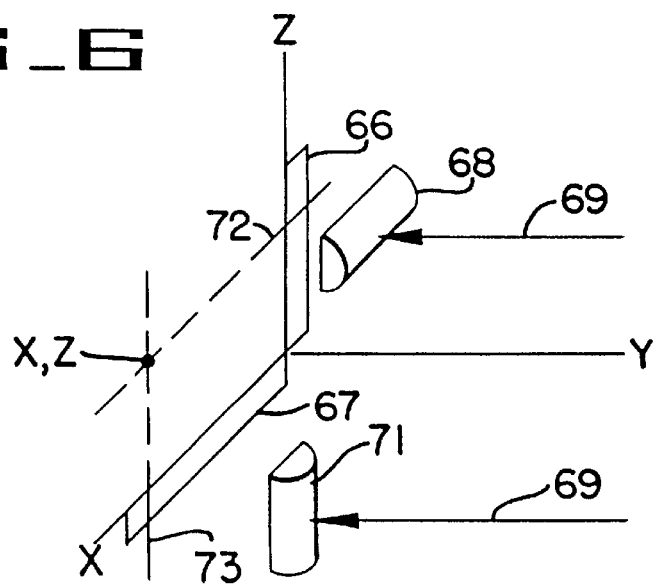
FIG_6

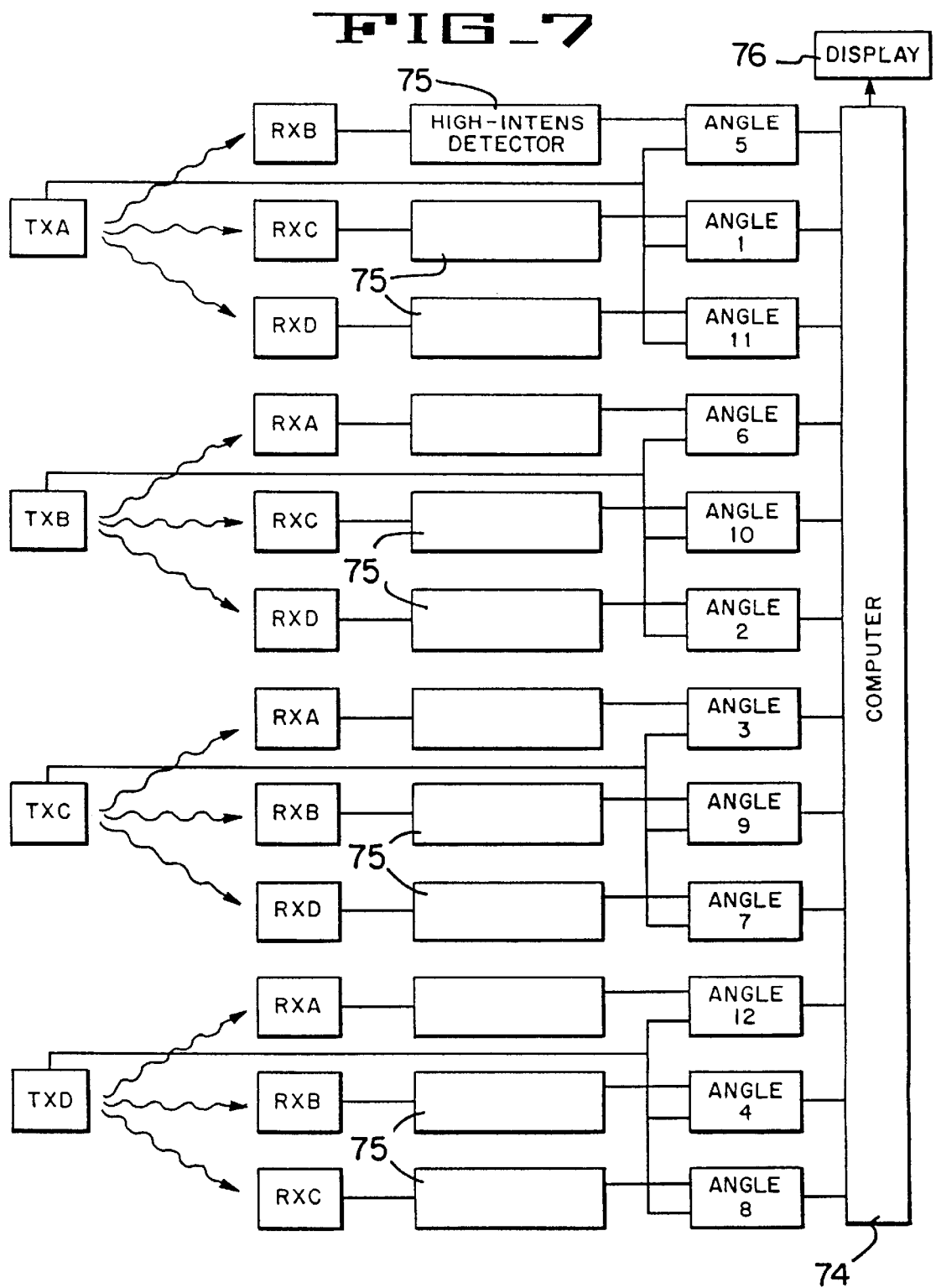

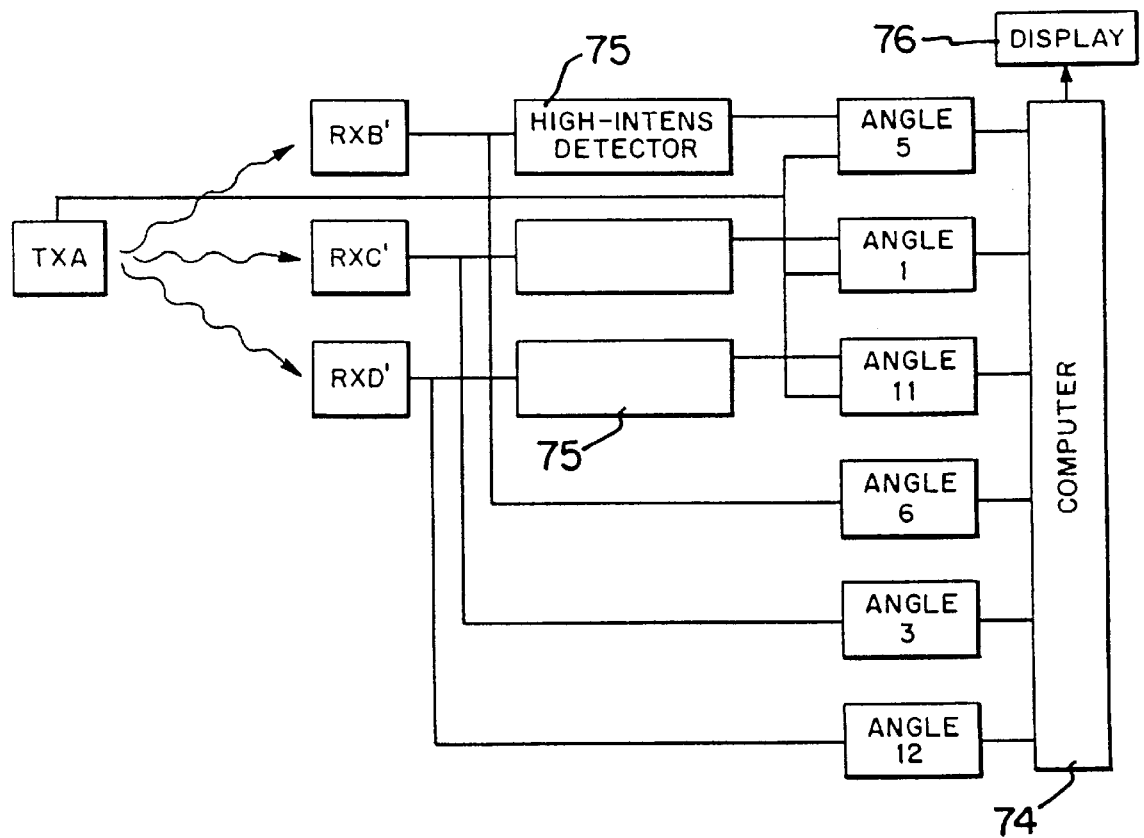
FIG_8

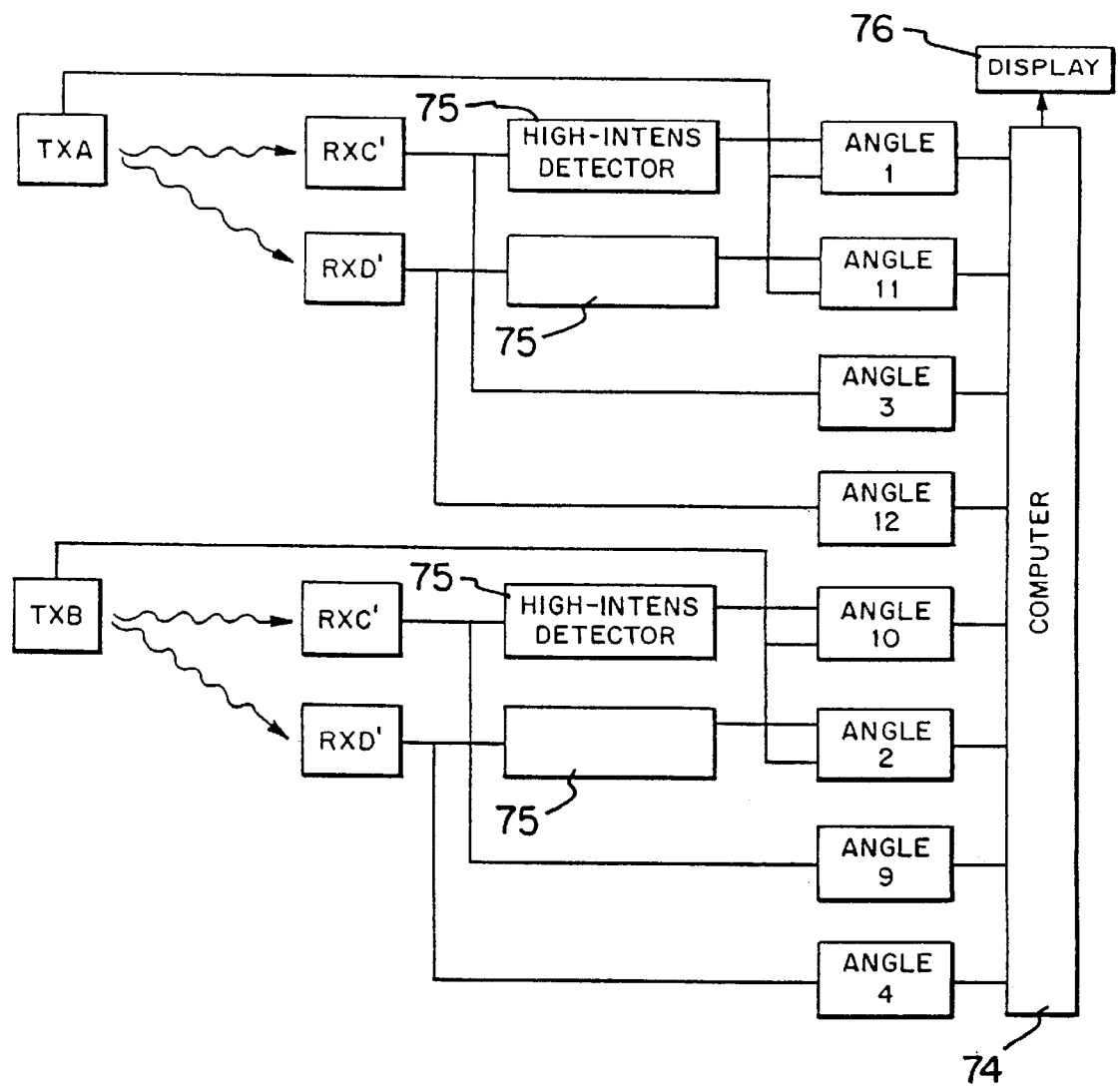
FIG_9

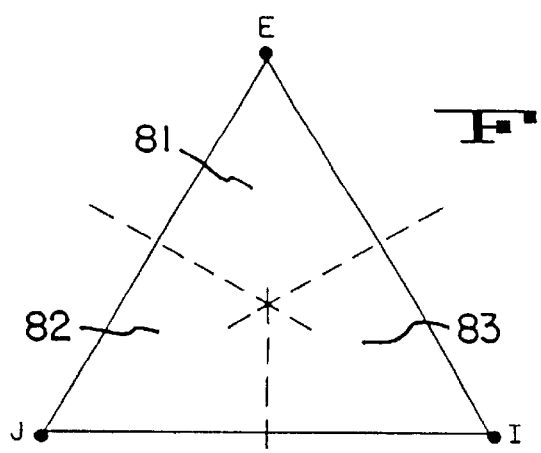
FIG_10
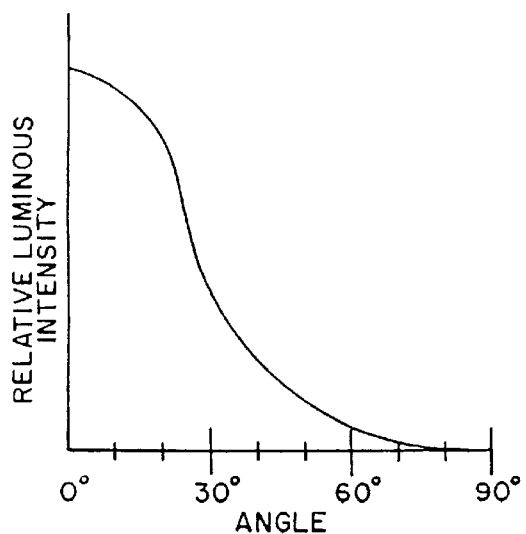
FIG_11
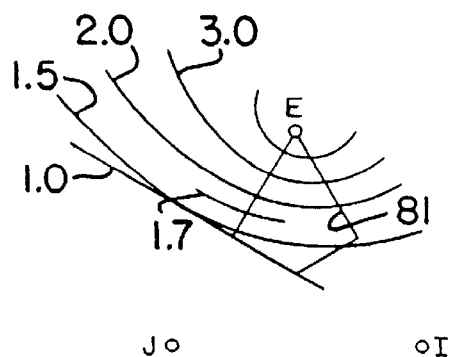
FIG_12
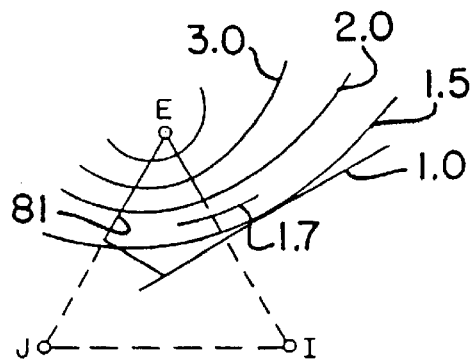
FIG_13

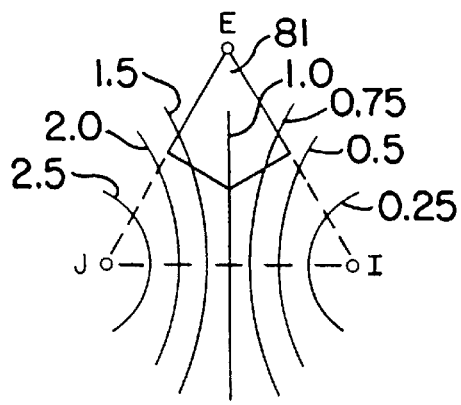
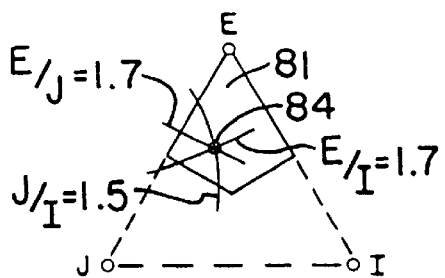
FIG_14
FIG_15
FIG_16
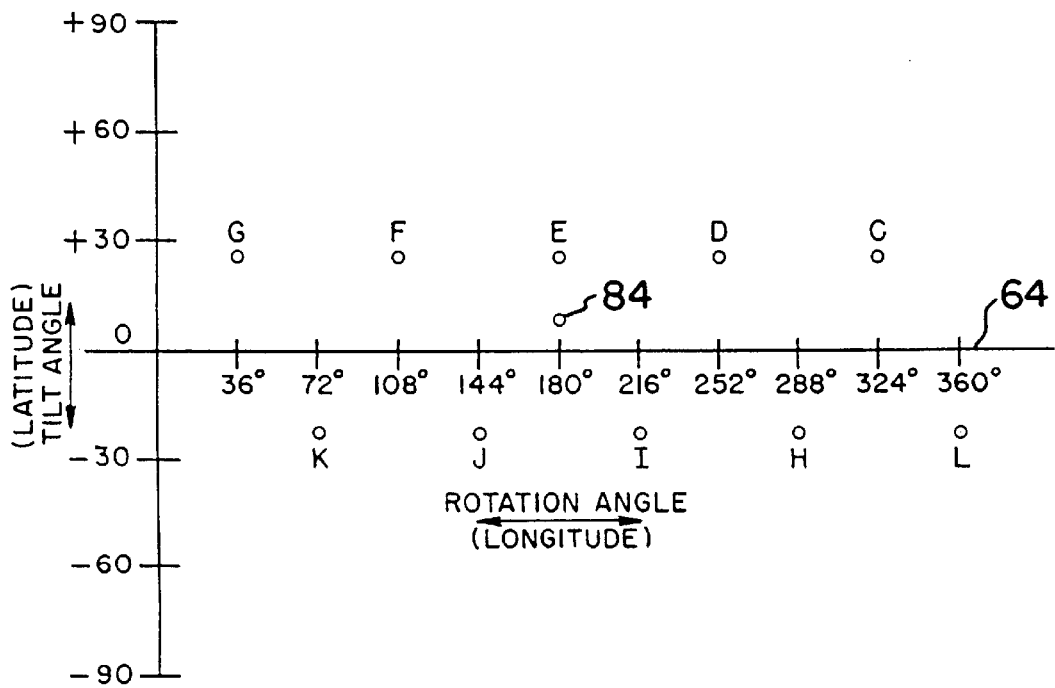

US 6,327,785 B1

FOUR SENSOR SYSTEM FOR WHEEL ALIGNMENT

This application is a CIP of application Ser. No. 08/674,366 filed Jul. 2, 1996, U.S. Pat. No. 6,181,993, which is a continuation of application Ser. No. 07/961,945, filed Oct. 16, 1992, abandoned.

SUMMARY OF THE INVENTION

This invention relates to a wheel alignment system for vehicle wheels wherein a single means for angle measurement means is mounted in predetermined relationship to the plane of each of four vehicle support wheels. The angle measurement means provides wheel angle indicative output signals in redundant signal sets and wherein any signal set contains data sufficient to obtain alignment angles. Further means are provided for receiving and processing the redundant signal sets and for indicating alignment angles for the support wheels.

A wheel alignment system is disclosed herein for a vehicle having at least four support wheels wherein single omnidirectional angle measurement means is mounted on each wheel in known orientation with the plane of the wheel for determining the spatial angles relating to toe and camber between the planes of the wheel on which mounted and a projected energy beam and providing projected beam angle indicative signals corresponding thereto. Means is provided for receiving and processing the angle indicative signals for providing signals indicative of toe and camber alignment angles between the planes of the support wheels.

A wheel alignment system is disclosed herein for a vehicle having at least four support wheels wherein angle measurement means is mounted on each wheel in predetermined relationship with the plane of the wheel for providing wheel angle indicative output signals in redundant signal sets. Any signal set contains data sufficient to obtain desired wheel alignment angles. Further means is included for prioritizing the signal sets in the order of potential wheel alignment angle accuracy. Means is also included for selecting the highest accuracy priority signal set available and for processing the highest accuracy signal set available to obtain the desired wheel alignment angles.

An omnidirectional angle measurement apparatus is disclosed herein which includes spheroid-like mounting means having a plurality of mounting positions on the surface thereof, wherein each position is oriented in predetermined spatial position relative to a polar axis of the mounting means. A plurality of beam emitting means is provided for individual mounting at ones of the plurality of mounting positions for emitting energy beams in predetermined spatial directions relative to the polar axis. Means is included for receiving the energy beams and for identifying the spatial direction of received beams toward said means for receiving relative to said polar axis.

An omnidirectional angle measurement apparatus is disclosed which includes mounting means having a polar axis and a plurality of mounting positions thereon. A plurality of beam emitting means are secured at ones of the plurality of mounting positions so that the beam emitting means project beams omnidirectionally in predetermined directions relative to the polar axis. Means is included for sequentially exciting the beam emitting means and for providing an emission sequence signal corresponding thereto. Means is also provided for receiving the projected beams and the emission sequence signal to thereby identify the projection directions of the received beams relative to the polar axis.

An omnidirectional measurement apparatus is disclosed herein which includes at least two beam receiver means mounted in spaced positions and a mounting base positioned in a known location having at least two light sources mounted in known position in the mounting base and emitting beams extending in directions separated by a known angle. Means is also provided for sweeping the emitted beams from the two light sources cyclically through an angle large enough to impinge upon each of said beam receiver means.

Further, an angle measurement apparatus is disclosed for measuring angular relationship between a plurality of adjustably interconnected members without reference to vertical. Omnidirectional beam projector means is mounted in known orientation relative to each member. Beam receiver means is mounted on each member for receiving projected beams and for providing beam reception signals. Means is provided for receiving and processing the beam reception signals and for providing member relative angular orientation in at least two substantially orthogonal planes.

A vehicle wheel alignment system for use on level or non-level vehicle support surfaces is disclosed which operates to align wheels on a vehicle having at least four support wheels with defined wheel planes. Omnidirectional beam projection means is mounted on each support wheel in known orientation with the wheel plane. Beam reception means is mounted in known position on each support wheel providing beam received signals when impinged by a projected beam. Also included is means for receiving the beam received signals and for determining the spatial angles between a wheel plane and a beam projected from the omnidirectional beam projection means mounted on one support wheel toward the beam reception means mounted on another support wheel. Further, means is included for combining the determined spatial angles for obtaining wheel alignment angles in the wheel reference planes for the four support wheels.

A wheel alignment system has been developed for a vehicle having left and right front and left and right rear wheels having wheel planes subject to alignment adjustments. The system includes first means for measuring the line of sight angles between the plane of the left front wheel and the planes of the right front, left rear, and right rear wheels. Further, second means is included for measuring the line of sight angles between the plane of the right front wheel and the planes of the left front, right rear, and left rear wheels. Processor means is provided for receiving the line of sight angle measurements from the first and second means for measuring and for providing output indicative of the relative orientations of the left and right front and the left and right rear wheel planes.

A wheel alignment system is disclosed for a vehicle having four wheels with wheel planes subject to alignment adjustment which includes first wheel mounted means for measuring the line of sight angles between the plane of a first wheel and the planes of second, third and fourth wheels. Processor means is provided for receiving the line of sight angle measurements from the first wheel mounted means for measuring and for providing output indicative of the relative orientations of the four wheel planes.

A wheel alignment system is disclosed herein for measuring wheel alignment angles of front and rear wheels, wherein the system includes first and second means for measuring angles mounted on and in predetermined orientation with the left and right front wheels, and third and fourth means for measuring angles mounted on and in predetermined orientation with the left and right rear wheels. The first, second, third and fourth means for measuring angles are in optical communication with each other, whereby line of sight angle measurement outputs are produced by each means for measuring angles. Processor means is provided for receiving the line of sight angle measurement outputs and for providing output indicative of the relative orientations of the front and the rear wheels.

BRIEF DESCRIPTION OF THE DRAWINGS

FIG. 1 is a diagrammatic plan view of a four wheel vehicle showing an installation of one embodiment of the present invention.

FIG. 2 is an elevation of the diagrammatic view of FIG. 1.

FIG. 3 is another diagrammatic plan view of additional aspects of the invention.

FIG. 4 is a section view of one embodiment of the omnidirectional angle measurement device.

FIG. 5 is a three-view depiction of a solid state embodiment of the omnidirectional angle measurement device of the present invention.

FIG. 6 is a perspective diagram of one type of directional energy beam receiver which may be used in the present invention.

FIG. 7 is a block diagram of the embodiment shown in FIG. 1.

FIG. 8 is another block diagram of an embodiment of the invention included in FIG. 1.

FIG. 9 is yet another block diagram of an embodiment of the invention included in FIG. 1.

FIG. 10 is a diagram of one face of the omnidirectional angle measurement device of FIG. 5.

FIG. 11 is a graph of luminous intensity as a function of energy beam cone angle for one beam sensor useful in the present invention.

FIG. 12 is an intensity ratio diagram relating to a sub space of the face of FIG. 10.

FIG. 13 is another intensity ratio diagram for a sub space of the face of FIG. 10.

FIG. 14 is another intensity ratio diagram for the same sub space of the face of FIG. 10.

FIG. 15 represents a solution within the sub space of the face of FIG. 10.

FIG. 16 represents a solid angle projection map for one of the projectors of FIGS. 4 or 5 showing latitude or tilt angle on the ordinate and longitude or rotation angle on the abscissa.

DESCRIPTION OF THE PREFERRED EMBODIMENT

Referring to FIG. 1 of the drawings, a vehicle frame 20 is shown which is supported by four support wheels represented by the wheel planes A, B, C and D. An angle measuring device, to be hereinafter described, is mounted in known orientation to each one of the support wheel rotation planes. These angle measurement devices are represented in FIG. 1 by the item nos. 21, 22, 23 and 24 in known orientation to wheel planes A, B, C and D respectively. A scaling factor function is provided for the embodiment of FIG. 1 by placement of a receiving device 26, such as a retro reflector, at a known distance d away from angle measurement device 22 on wheel plane B. The distance d is known and the angle θ of FIG. 1 may be measured by the angle measuring device 21. Consequently the distance from angle measuring device 21 to angle measuring device 22 may be computed. Since angles 1 through 12 of FIG. 1 are measurable by the angle measuring devices 21 through 24, all other distances between measuring devices are known through the construction of similar triangles. It should be noted that the angles 1 through 12 are measured line of sight, whether they require lines of sight across, along or diagonally of the vehicle frame 20.

As may be seen in FIG. 1, angle 1 represents the angle in plan view (toe) between wheel plane A and the direction from angle measurement device 21 directly to angle measurement device 23. When a beam is projected by angle measurement device 21 and received by angle measurement device 23 the angle 1 is described with respect to wheel plane A. In like fashion when a beam is projected from the angle measurement device 23 to be received directly by angle measurement device 21 angle 3 of FIG. 1 is described with respect to the plane C of the left rear support wheel of the vehicle. The remaining angles 4 through 12 as shown in FIG. 1 are obtained in similar fashion including those angles between the wheel planes in the diagonal directions between the left front and right rear of the vehicle represented by angles 11 and 12 and between the right front and left rear represented by angles 9 and 10. The angles measured in the view of FIG. 1 may be considered angles in yaw and when combined will provide wheel toe.

FIG. 2 is an elevation view of the embodiment of FIG. 1 taken at the forward end of the frame 20. The angle measurement devices 21 and 22 in FIG. 2 are capable of measuring angles in roll or camber as represented by angles 13 and 14 of FIG. 2. The planes A and B of the front wheels supporting the frame 20 have spin axes 27 and 28 respectively depicted in FIG. 2. A beam projected directly between angle measurement means 21 and 22 forms one side of the angles 13 and 14 and as depicted in FIG. 2 extends to the spin axes 27 and 28 of each of the wheels A and B, respectively. Thus, it may be seen that the angle measurement means 21 and 22 provide angular data from which camber angles of the support wheels will be obtained. It should be noted that the alignment angles referred to herein are with reference to the wheel reference planes relative to the support wheel set and have no relation to local vertical. As a result, the system performs alignment on non-level support surfaces for the vehicle as well as level support surfaces without need for a local vertical sensor. Additionally the angle measurement devices disclosed herein are capable of measuring angles in pitch as may be perceived by visualizing a side elevation similar to the front elevation of FIG. 2.

It may also be seen in FIG. 2 that ride height may be obtained through use of the disclosed system. Since the positions of the angle measurement devices 21 and 22 are known relative to a ride height reference point 33 on the vehicle chassis, angle measurements may be made between measurement devices 21 and 22 and receiving devices 29 and 31 mounted on an underlying support plane 32. Solution for ride height $h_1$ is made from knowledge of the distance between the receivers 29 and 31 and the measured angles.

When the ride height for a vehicle is specified between a point on the suspension and a point on the body represented by the points 36 and 37 respectively in FIG. 2, similar angle measurements made between receiving devices placed at the points 37 and 36 and the angle measuring devices 21 and 22 provide angular data sufficient to compute the specified ride height between the suspension and the body represented by $h_2$.

In view of the description given hereinbefore, the angle measurement devices of FIGS. 1 and 2 may be used to determine steering axis inclination and caster angles. To accomplish this for steering axis inclination steerable wheels are turned to an arbitrary turn angle and the measurement of the turn angle is made. The wheels are then turned to another arbitrary turn angle, the angle measured and the difference in pitch (as projected on a longitudinal plane) at the two yaw angles, is computed. The well known relationship using the pitch difference is used to obtain steering axis inclination. Caster angles may be obtained by obtaining the change in roll angle (as projected on a lateral plane) at the two known yaw or turn angles and then using the well known relationship between the measured angles and caster.

Turning to FIG. 3 of the drawings, points 38 and 39 are known to be on the centerline of the chassis 20. The angle as measured from each of the angle measurement devices 21 and 22 to each of the points 38 and 39 will provide sufficient data to construct the centerline of the vehicle relative to the position of the wheel rims A, B, C and D. A center line of the vehicle may also be determined if access to the centerline of the chassis 20 is not available if angles are measured between two measurement devices and a pair of points equidistant from the centerline of the vehicle chassis 20. In such a case measurements may be made of the angles between angle measurement devices 23 and 24 and points 41 and 42 known to be equidistant from the chassis centerline as well as between devices 23 and 24 and points 43 and 44 also equidistant from the center line. As a result data is provided from which the chassis centerline may be obtained. The points 38, 39, 41, 42, 43 and 44 may have retro reflectors or optical receivers of various kinds, for example, mounted thereat for accomplishing angle measurements.

In FIG. 3 the angle θ may be measured by measurement device 21. The angle has as one side the line between devices 21 and 22. The other angle side is the distance between device 21 and receiver 26. The distance d is known. The distance from device 21 to device 22 may then be computed. All other distances between wheels may then be calculated using similar triangles.

As further seen in FIG. 3, two points $P_1$ and $P_2$ on a vehicle frame C channel 46 are shown in optical communication with at least two of the angle measurement devices 21, 22, 23, 24. As shown, devices 22 and 24 measure angles from which space coordinates $X_1Y_1Z_1$ and $X_2Y_2Z_2$ respectively are calculated from the measured angles, because the angle sensors, to be hereinafter described, are capable of measuring angles in space which may have pitch, yaw and roll components relative to the vehicle support wheels ABCD. A plurality of points such as $P_1$ and $P_2$ may be located to see if the C channel is straight or the location of the points may indicate a shift from the normal position of the channel. As a result, frame collision damage may be assessed and repairs made prior to undertaking wheel alignment.

With reference now to FIG. 4 of the drawings an electro mechanical omnidirectional angle measurement device is shown. A framework 48 is shown in which is mounted a rotation driver 49 having a shaft 51 extending from one end. An angle encoder 54 has a shaft 53 extending therefrom which is coupled to shaft 51 by a coupler 52. The encoder 54 is also mounted in the frame 48. The rotation driver has another shaft 56 extending from the side opposite shaft 51 which has a reflector 57 mounted for rotation thereon to provide the above-discussed means for sweeping emitted beams cyclically through an angle large enough to impinge upon beam receiver means. A reflecting face 58 on the reflector causes energy beams from light emitting diodes or laser transmitters 59, 61 and 62 to be transmitted from face 58 as shown. The beams from these transmitters are emitted in known sequence so that a received beam may be identified. The beam transmitters are mounted in the frame 48 as shown and a revolving beacon of diverging beams results when the reflector is rotated. The emitting devices 59, 61 and 62 are mounted as shown in the overhanging portion of the frame 48 so that they project beams at approximately 0 degree reference direction as well as above and below the 0 degree reference direction by some known angle in the range of ±30 degrees. It may be said that the beams emit from the surface of a sphere at substantially 0 degrees of latitude and 20 to 30 degrees of latitude above and below 0 degrees. The beams will be projected through the surface of the sphere repeatedly through 360° of longitude as the reflector 57 is rotated. It may be seen that the measurement device of FIG. 4 is omnidirectional inasmuch as the projector transmits multiplexed beams in multiple directions in space together with an encoder signal indicating instantaneous projection direction and beam identification so that the projection angle of a received beam is determined. Directional interpolation of the beams, as hereinafter described, to determine a direction from a projector to a receiver provides a true omnidirectional feature.

FIG. 5 shows another embodiment of an omnidirectional measurement device wherein a plurality of LED's or laser beam projectors are arranged on the surface of a spheroid-like solid 63 to project energy beams in known directions relative to the orientation of the solid. The spheroid-like solid shown in the preferred embodiment of FIG. 5 is illustrated by a central top view and two elevation projections of the device. The solid as shown in FIG. 5 has a number of faces. It will be described as a spheroid-like solid having a polar axis A-B. A centrally located plane, seen on edge as line 64, represents an equator of the spheroid-like shape as it intersects the surface thereof. The solid illustrated in FIG. 5 has twenty faces which are equilateral triangles. The beams are projected radially from the spheroid through the points or intersections of the equilateral faces. The LED generated beams are conical in shape and are either known or determinable.

The projectors are arranged on the surface of the spheroid-like solid so that the center of the cone of each beam is projected along a radial line from the center of the spheroid-like solid through the points on the surface C,D, E,F,G,H,I,J,K,L. As a result beams are projected from the angle measurement device 63 of FIG. 5 at angles approximately 27° north latitude relative to an equator 64 and at approximately 27° south latitude relative thereto. Five energy beam projectors are located at the north latitude and five are located at south latitude. The north and south latitude located projectors are staggered so that a beam is projected every 36° of longitude around the spheroid-like shape of FIG. 5. The poles of the solid of FIG. 5 are at the points designated A and B as mentioned hereinbefore and serve as a reference for mounting the angle measurement device in known location rotationally and with regard to its polar axis relative to a supporting wheel plane represented by the planes A, B, C and D of FIG. 1. While no projectors are mentioned in FIG. 5 at points A or B (the poles), such projectors could be included if the situation warranted. Moreover, a greater number of projectors and different face configurations for the spheroid could be provided. In any event, the projectors are energized sequentially and a signal is provided by the energizing source which indicates which projector is emitting a beam at any instant.

It may be seen that the beam projector of FIG. 5 is also an omnidirectional beam projector in view of the multiple beam projections in known directions in space. Directional interpolation from beam identification is disclosed herein in conjunction with FIGS. 10 through 16. The beams are energized in a known sequence as mentioned before so that the rotating beam solid angle projection direction is known at any point in time. When beams are received at spatial points of interest, a projection direction for the received beam is thereby determined. Accuracy of 0.05 degrees in selected ranges and 0.10 degrees in the remainder of the range appears feasible. An LED beam projector for use in the omnidirectional angle measurement device of FIG. 5 is Hewlett Packard HLMP-7019.

With reference now to FIG. 6 of the drawings a three axis coordinate system is shown having an angle sensitive receiver 66 aligned with the Z axis and an angle sensitive receiver 67 aligned with the X axis. A cylindrical lens 68 is placed in the path of an impinging projected beam 69 ahead of the angle sensitive receiver 66. Another cylindrical lens 71 is placed in the path of beam 69 in front of the angle sensitive receiver 67. As a result a line of light 72 is created which falls across the angle sensitive receiver 66 and another line of light 73 falls across the angle sensitive sensor 67. Consequently, the center of the cone of light projected by one of the beam projectors C through L (FIG. 5) is known to impinge the receiver at the point X,Z. The beam receiver of FIG. 6 is described herein to illustrate one type of directional beam receiver to determine the direction from which the energy beam has arrived at the point of reception. As will be hereinafter described, an angle measurement device as defined herein includes a beam projector and type of directional receiver such as illustrated in FIG. 6 or a combination of one of the omnidirectional beam projectors of FIG. 4 or 5 together with a non directional beam receiver or a combination of an omnidirectional beam projector and a directional receiver. Such angle measurement devices are referred to herein as single devices for measuring angles to distinguish over systems which employ more than one angle measurement device on a vehicle wheel such as multiple optical projectors and receivers and gravity sensing devices. A typical sensor represented by the directional sensors 66 and 67 is the L30 sensor manufactured by SiTek Electro Optics, Sweden, marketed in the U.S.A. by EG and G Foton Devices, Salem Mass.

Turning now to FIG. 7 of the drawings a measuring device is shown for each of the support wheels designated by the blocks TXA, TXB, TXC and TXD. As described hereinbefore, the time at which the omnidirectional beam projector projects a beam is known and a specific spatial projection direction relative to a support wheel plane of rotation is assigned to each beam. Beams are projected from beam projector TXA, for example, to be received by the non directional receiver mounted on one or the other three support wheels represented by the blocks RXB, RXC, RXD in the diagram of FIG. 7. When non directional receiver RXB receives a projection beam from TXA for example, the intensity of the beam is detected at a high luminous intensity beam detector 75 shown in the block connected to non directional receiver RXB. Several beams are received, the higher intensity beams being closer to being in a direct line of sight from the omnidirectional projector to the non directional receiver. The three highest intensity beams in this embodiment are processed in a fashion to be hereinafter described to produce angle 5 as seen in FIG. 1. In like fashion the beam projector at each wheel projects beams toward the non directional receivers on each of the three other support wheels and the higher intensity beams are recognized to be processed and to produce data from which each of the other angles depicted in yaw in FIG. 1 and in roll in FIG. 2 may be computed. The measured angles for the projected beams extending between the beam projectors and the non directional beam receivers are processed in a computer 74 in FIG. 7 to provide relative angular orientation between the planes of the wheels A, B, C and D and the direct projection direction to the non directional receiver. These angles are then processed and the results are displayed in terms of desired alignment angles by a display 76.

It may be seen from FIGS. 7 and 1 that redundant sets of angle measurements may be obtained from which the desired alignment characteristics may be determined. For example, angles as described herein from the left rear wheel of the vehicle around the front to the right rear wheel of the vehicle are sufficient for obtaining toe angles of the four support wheels. In like fashion, measurement of angles from the left front wheel around the rear of the vehicle to the right front wheel are also sufficient to obtain toe alignment angles for all four support wheels. Numbers of other combinations for determining toe of all four support wheels as well as camber and other alignment characteristics are present if all measurements are made in the embodiment of FIG. 1 as shown in the block diagram of FIG. 7. Total rear toe, however, is most accurately measured when measured directly as in the case when angles are measured from the front wheel of the vehicle around the rear wheels of the vehicle to the opposite front wheel. Such a data set would be preferred for rear toe measurement because it is potentially more accurate and therefore would be assigned a higher priority by the system. Complete data sets which are redundant are prioritized by the computer in accordance with potentially higher accuracy measurement. Alternatively, data sets may be prioritized in accordance with some other criteria which may be controlled by an operator of the system or contained within the controlling program. As a result, each data set is recognized and prioritized by the system and the highest priority data set, depending on the prioritization, is selected to be processed to provide the alignment characteristics in the display 76. In the examples given, angle measurements at wheels around the front of the car and angle measurements at wheels around the rear of the vehicle, the optical path between the rear wheels, which would ordinarily be given highest priority for rear wheel toe, measurements might be blocked. Since that data set would be incomplete, the next highest priority complete data set would be automatically selected to be processed and to provide the basis for the display of alignment angles. Additionally, when all or several complete data sets are available they may be used in separate computations of the alignment angles and compared for acceptable error tolerances between the alignment system components The block diagram of FIG. 8 shows the configuration wherein one angle measurement device TXA is such as shown in FIGS. 4 or 5 and the other three angle measurement devices RXB', RXC', and RXD' are directional beam receivers such as shown in FIG. 6. The receivers provide output which is used to determine the angles of projection from TXA (angles 5, 1 and 11) through the high intensity detectors as described in conjunction with FIG. 7. The receivers also provide output which is a direct indicator of the angles of impingement (angles 6, 3 and 12 of FIG. 8) of the projected beams relative to the wheel plane on which the directional receiver is mounted. The embodiment of FIG. 8 provides enough data for toe camber, SAI and caster alignment angle determination as described hereinbefore, but does not provide redundant data.

The block diagram of FIG. 9 shows an embodiment where the angle measurement devices 21 and 22 of FIG. 1 are omnidirectional angle measurement projectors and the angle measurement devices 23 and 24 are directional beam receivers. The angles indicated in FIG. 9 are determined in the same fashion as described for FIG. 8 except that a larger number of angles are provided thereby affording some redundancy in data. As indicated in FIG. 9, the directional receivers RXC' and RXD' receive the projected beams from omnidirectional transmitter TXA and the angles 1 and 11 are obtained through the use of the high intensity detectors 75 while the angles of impingement 3 and 12 are measured directly using the signals from RXC' and RXD'. In the same fashion, angles 10 and 2 of FIG. 1 are obtained by the cooperation of TXB, RXC', RXD' and high intensity detectors 75, while angles 9 and 4 are obtained by processing directly the output signal from RXC' and RXD'. As with the embodiments of FIGS. 7 and 8, the processed angle signals are utilized in algorithms by computer 74 to provide the alignment data of interest called upon by the system on display 76.

It may be seen from the foregoing that the concept disclosed herein includes the embodiment having omnidirectional angle sensing devices on three vehicle wheels and a directional receiver on the fourth vehicle wheel.

FIG. 10 shows one face of the spheroid-like solid depicted in the three views of FIG. 5 wherein the face is seen at the left of the lower view. The equilateral triangle EIJ which bounds the face is shown in FIG. 10 for the purpose of illustrating how the received projected beams are identified and how interpolation is performed to locate the direction in space relative to a wheel plane of the omnidirectional energy being received. The receiver output signal is passed to the high intensity detector 75 which identifies, as mentioned hereinbefore, the highest intensity beams in a number of serially received beams and ranks the received beams in order of luminous intensity. The equilateral triangle shown in FIG. 10 is divided into three subspaces 81, 82 and 83 by drawing the bisector of each side of the triangle EIJ. As mentioned earlier, the projection direction of the beams from the beam projector of FIG. 5 through each apex of triangle EIJ is known relative to the polar axis of the spheroid-like solid of FIG. 5. The purpose of the subspaces is to provide an area within which may be located, by interpolation, a point on the surface of the spheroid through which a projected radial beam would pass to impinge directly on the receiver.

Each beam has a conical beam shape wherein the luminous intensity of the beam diminishes when the beam is detected at an angle of departure from the polar axis of the cone. FIG. 11 shows this diminishing luminous intensity as a function of departure angle. This characteristic is used in the following described interpolation process for finding the projected radial beam of interest.

In the example used here, the highest intensity beam received is projected from apex E, the next highest from apex J and the third highest from the apex I. Three ratios of highest beam intensities are used here, although two, four or more could be used if desired. FIG. 12 shows the loci of points of constant intensity ratios of beam E to beam J. They are thought to be parabolic. Several curves of constant intensity ratio are shown passing through subspace 81 because that is the area of interest since beam E is of highest intensity. For sake of this example, a ratio of E to J of 1.7 is calculated. FIG. 13 shows a ratio of E to I intensity of 1.5 in subspace 81. A ratio of J to I (second to third intensity) of 1.7 is sensed, which also passes through subspace 81 as seen in FIG. 14. All three loci intersect substantially at point 84 as seen in FIG. 15. Thus, the projected radial beam which would pass through the spheroid-like solid 63 of FIG. 5 at the point 84 in the face bound by EIJ represents the beam direction in space which is sensed by the non-directional sensor at an opposing wheel or by a directional sensor at an opposing wheel when it performs the function of sensing the projection direction of the beam received.

FIG. 16 shows a solid angle graph which may be used as a substitute for the method of determining the direction of the radial beam of interest described in conjunction with FIGS. 12–15. As seen in FIG. 16, a plot of tilt angle or latitude angle appears on the ordinate and a plot of the rotation angle or longitude angle appears on the abscissa. The abscissa shows that the omnidirectional beam projector travels through 360°. The ordinate shows that the directional projected beams are at approximately 27° north latitude (plus 27°) and 27° south latitude (minus 27°). A zero tilt angle line represents the equator 64 of the spheroid like solid of FIG. 5. Relative intensities are plotted on the graph of FIG. 16 wherein the beam projected along the direction through the point E in FIG. 5 is most intense, through the point J is second in intensity and through point I is third in intensity. Interpolation on the graph of FIG. 16 provides the same point 84 for the projection direction directly from the omnidirectional beam projection device to the receiver which has sensed the aforementioned relative luminous intensities.

Several algorithms are necessary for a description of the specific beam projector utilized which will describe the relationship of the luminous intensity as a function of angular deviation from the polar axis of the projected conical beam. Additionally, loci of points representing constant ratios of luminous intensity must be defined for the specific beam projectors used. An algorithm for converting measured intensity ratios into subspace location is necessary. Once a certain number of signals representing highest luminous intensity projected beams are selected, the intensity levels must be ranked from the highest to the lowest of interest. Ratios must then be calculated between the highest and second highest, highest and third highest, and second highest and third highest. The aforementioned constant ratio algorithms may then be used to determine the position in subspace through which a radial beam must pass thereby obtaining the spatial direction of the beam. The algorithms for converting angular measurements between projected beams and wheel planes into alignment angles using similar triangles are then defined. All measurements are undertaken using the planes of the support wheels as reference instead of a gravity vector. Chassis diagonal line of sight measurements determine vehicle geometric shape and provide redundant measurements for monitoring the accuracy of the other angle measurements. The angle measurement means 21–24 are all mounted at the mid wheel height. All angles and alignment data are referenced to the wheel planes of the support wheels and are referenced to the vehicle frame by means of retroreflectors or receivers mounted at known points on the frame. The absolute position of the wheels relative to the frame is obtained through the use of a scaling device. Specific beam projector luminous intensity characteristics may be measured and stored for use in interpolating between beam projectors for defining specific directions from a beam projector to a beam receiver.

The system described herein provides alignment angle data redundancy for toe. Measurements in yaw, roll and pitch are made at each wheel and a prioritization scheme of the redundant data sets is predetermined in the system instructions. Alignment may be performed on non level racks or on non level ground because there is no vertical reference necessary for the system. Frame reference measurements may be made between the support wheels and the vehicle chassis prior to alignment adjustment of the support wheels so that collision repairs may be undertaken if it appears a portion of the deviation from alignment specification is due to chassis/frame damage. Redundancy may be obtained for vehicle chassis data if more than two angular measurement instruments are in communication with points on a frame member, such as points P1 and P2.

Although the best mode contemplated for carrying out the present invention has been herein shown and described, it will be apparent that modification and variation may be made without departing from what is regarded to be the subject matter of the invention.

What is claimed is:

1. An omnidirectional angle measurement apparatus comprising:

spheroidal mounting means having a plurality of mounting positions on the surface thereof, wherein each said position is oriented in predetermined spatial position relative to a polar axis of said mounting means, a plurality of beam emitting means omnidirectionall mounted at ones of said plurality of mounting positions for emitting energy beams in predetermined spatial directions relative to said polar axis, means for receiving said energy beams and for identifying the spatial direction thereof toward said means for receiving relative to said polar axis.

2. An omnidirectional angle measurement apparatus as in claims 1 wherein said means for receiving comprises:

non-directional beam sensitive means providing receiver output responsive to beam reception, and means for identifying received beams and for interpolating spatial angles from said emitters directly to said means for receiving.

3. An omnidirectional angle measurement apparatus comprising:

mounting means having a polar axis and a plurality of mounting positions thereon, a plurality of beam emitting means secured at ones of said plurality of mounting positions so that each of said beam emitting means projects a plurality of beams omnidirectionally in multiple predetermined directions relative to said polar axis, means for sequentially exciting said beam emitting means and for providing an emission sequence signal, and means for receiving said projected beams and said emission sequence signal for identifying the projection directions of received beams relative to said polar axis.

4. An omnidirectional angle measurement apparatus comprising:

at least two beam receiver means mounted in spaced positions, a mounting base positioned in a known location, at least three light sources mounted in known positions in said mounting base and emitting beams extending in directions separated by a known angle, and means for sweeping said emitted beams from said at least three light sources cyclically through an angle large enough to impinge upon each of said beam receiver means.

5. An omnidirectional angle measurement apparatus as in claim 4, wherein said at least two beam receiver means comprises a plurality of beam receivers mounted individually on different members, whereby individual angles between said mounting base and said different members are measured.

6. An angle measurement apparatus for measuring angular relationship between a plurality of adjustably interconnected members without reference to vertical, comprising:

omnidirectional beam projector means mounted in known orientation relative to each said member for projecting a plurality of beams in multiple directions in space, beam receiver means mounted on each said member for receiving said projected beams and for providing beam reception signals, and means for receiving and processing said beam reception signals and for providing member relative angular orientation in at least two substantially orthogonal planes.

\* \* \* \* \*